United States Patent [19]

Schober

[11] Patent Number: 5,748,140

[45] Date of Patent: May 5, 1998

[54] SYSTEM FOR TRACKING RADAR TARGETS IN BACKGROUND CLUTTER

[75] Inventor: Michael B. Schober, Tucson, Ariz.

[73] Assignee: Hughes Electronics, Los Angeles, Calif.

[21] Appl. No.: 627,813

[22] Filed: Mar. 28, 1996

[51] Int. Cl.$^6$ ..................................................... G01S 13/72
[52] U.S. Cl. .............. 342/90; 342/97; 342/140; 342/161; 342/162
[58] Field of Search ........................ 342/90, 93, 97, 342/140, 160, 161, 162

[56] References Cited

U.S. PATENT DOCUMENTS

| | | | |
|---|---|---|---|
| 3,707,718 | 12/1972 | Ames | 342/100 |
| 3,774,202 | 11/1973 | Nolette | 342/25 |
| 4,137,533 | 1/1979 | Briechle et al. | 367/162 |
| 4,549,184 | 10/1985 | Boles et al. | 342/25 |
| 4,559,537 | 12/1985 | Pearson, Jr. et al. | 342/99 |
| 5,465,095 | 11/1995 | Bryant | 342/159 |
| 5,483,240 | 1/1996 | Hsu et al. | 342/17 |
| 5,629,705 | 5/1997 | Spettel et al. | 342/62 |

FOREIGN PATENT DOCUMENTS 0 747 723A  12/1996  European Pat. Off. .

4-013986 A  1/1992  Japan .

OTHER PUBLICATIONS

Document Number, vol. 016, No. 167 (P-1342), Date 22 Apr. 1992, Name Mitsubishi Hvy Ind Ltd.

*Primary Examiner*—John B. Sotomayor
*Attorney, Agent, or Firm*—Charles D. Brown; Wanda Denson-Low

[57] ABSTRACT

A radar tracking system 100 adapted for use with existing radar tracking systems. The inventive system includes a radar target detection system 106, 108 for detecting radar targets in clutter using magnitude and angular position information obtained from return signals. A tracking algorithm 104 is used to track and update the positions of said targets with respect to the position of the radar system. The tracking algorithm includes a true target angle estimator 110 for maintaining accurate target angle information when the target is clutter and when the target is out of clutter. The tracking algorithm maintains accurate target distance information when the target is in clutter and when the target is out of clutter. In a specific embodiment, accurate distance information is maintained in a track file 122 where the amplitudes of return signals are stored once a target is detected by the detection system 100.

11 Claims, 4 Drawing Sheets

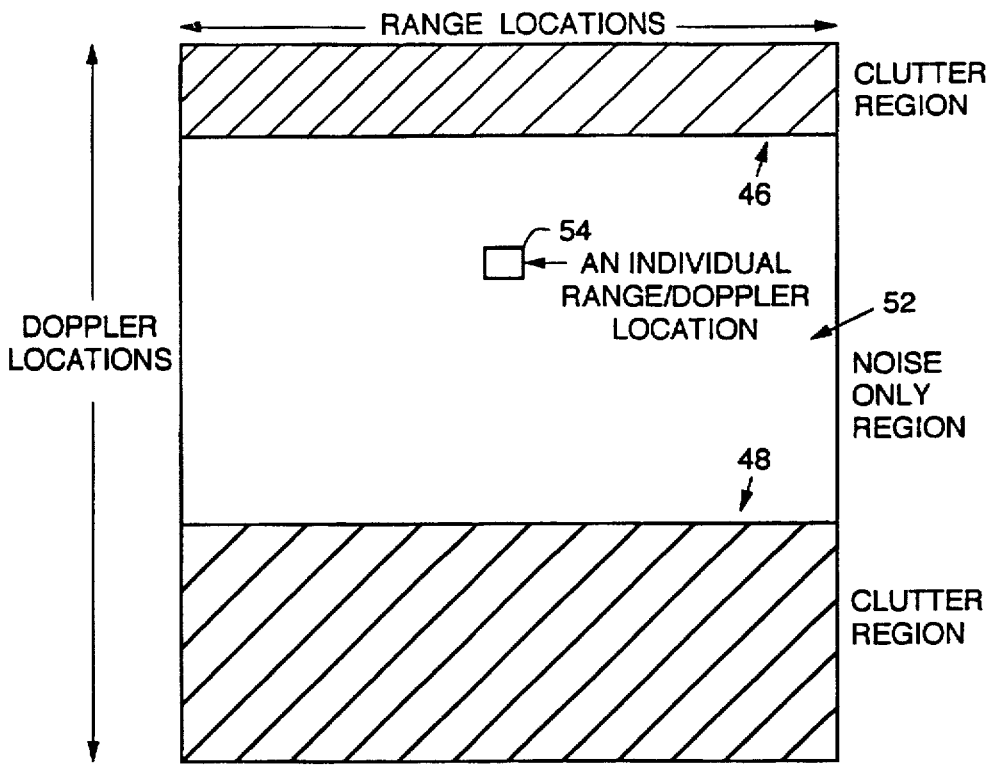
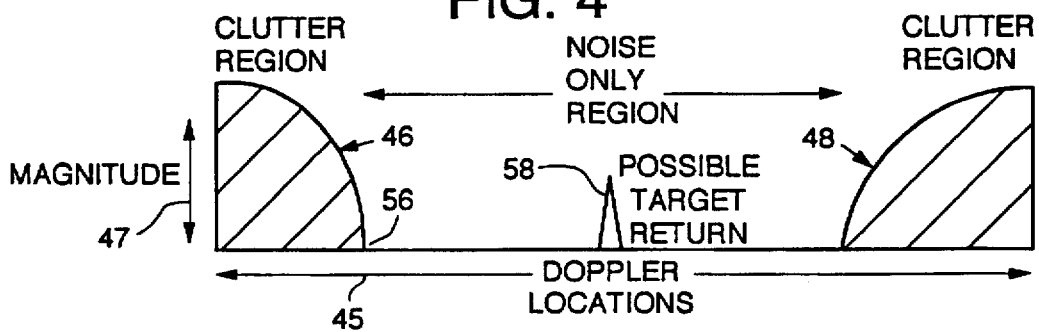
FIG. 3
FIG. 4
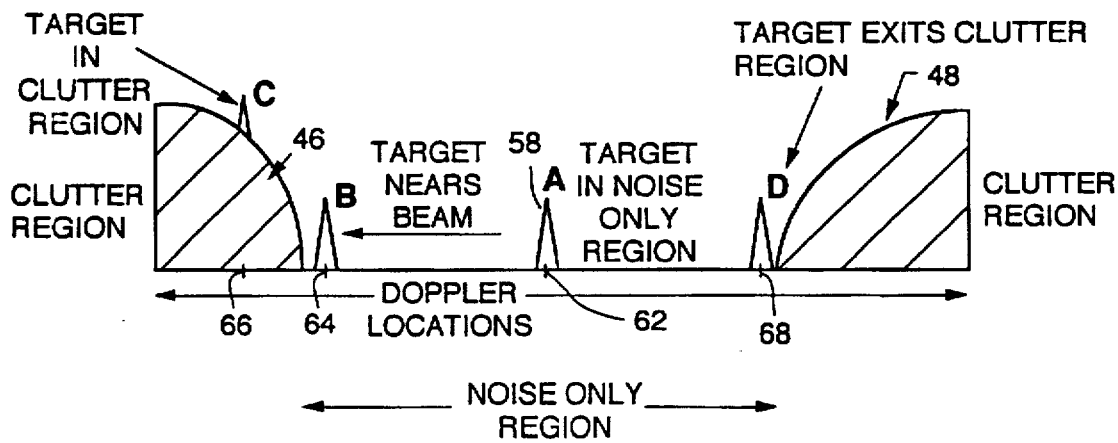
FIG. 5

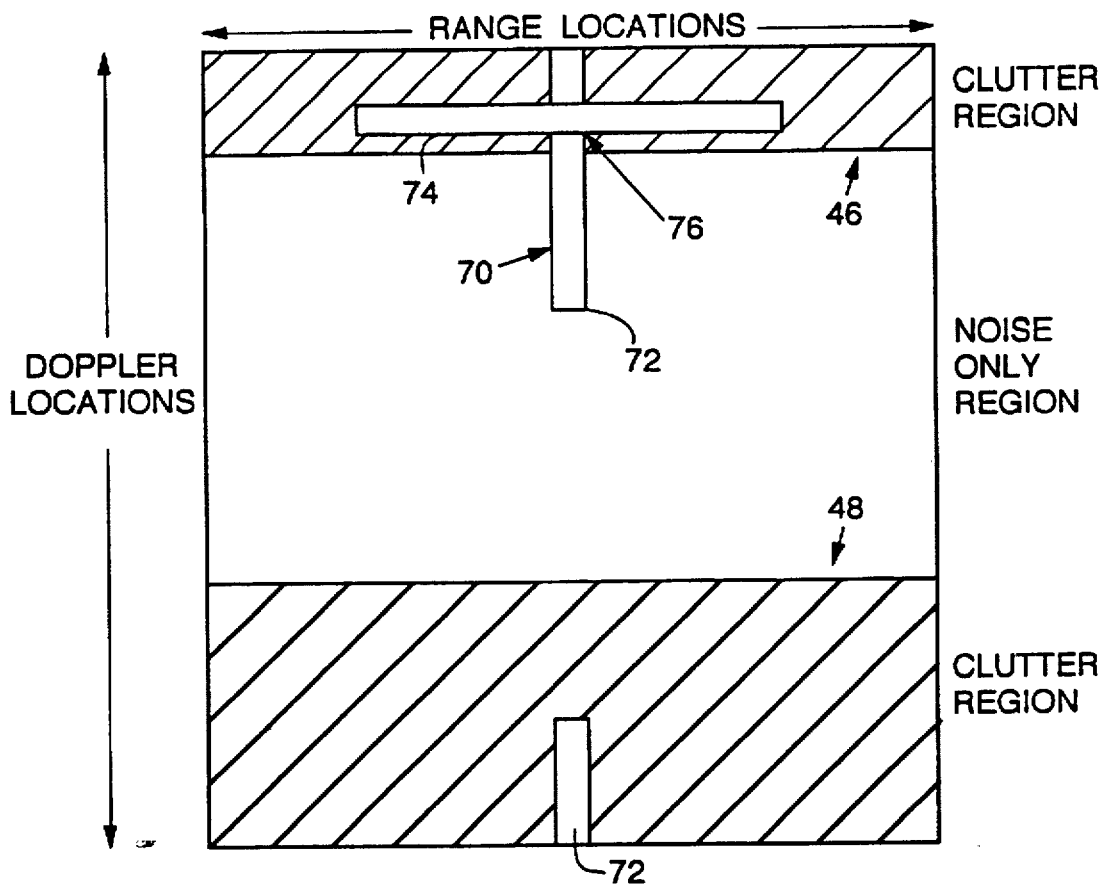
FIG. 6
FIG. 7
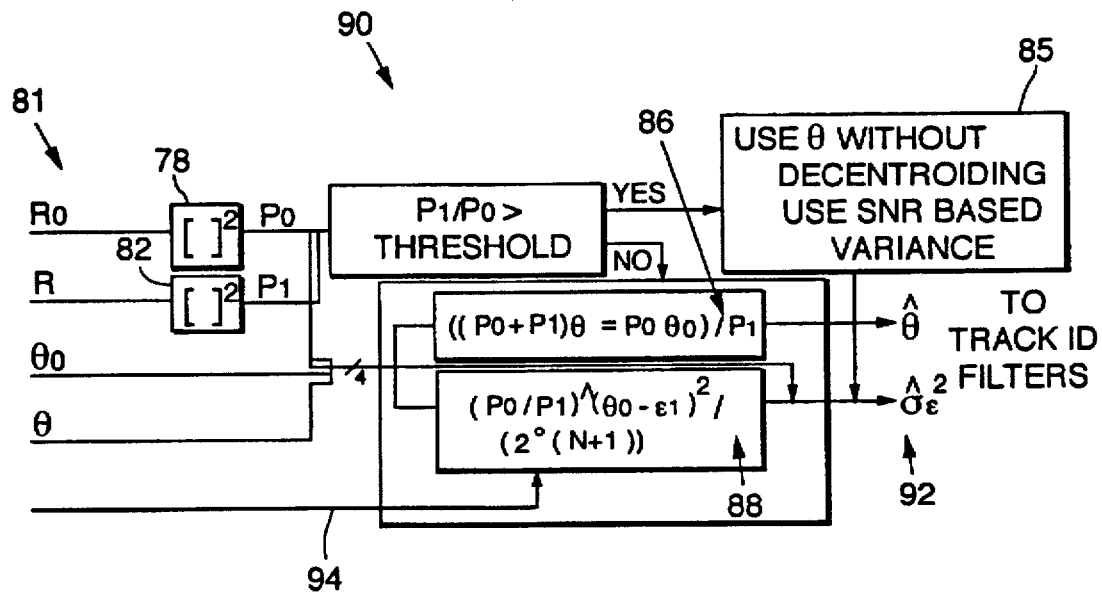

SYSTEM FOR TRACKING RADAR TARGETS IN BACKGROUND CLUTTER

BACKGROUND OF THE INVENTION

1. Field of Invention

This invention relates to radar systems for detecting and tracking targets. Specifically, the present invention relates to systems for tracking radar targets whose return signals are obscured by background clutter signals.

2. Description of the Related Art

Radar systems are used in a variety of applications ranging from missile guidance systems to air traffic control systems. Such applications require radar systems to accurately detect and track radar targets.

A typical radar system has a transmitter and a receiver. The transmitter transmits a signal and the receiver detects signals that are reflected back to the receiver. Transmitted signals may reflect off trees, hills, birds, houses, hail, targets and so on. Reflected signals that are not associated with targets are clutter returns while reflected signals associated with targets are target returns. Clutter returns obscure target returns making it difficult for the receiver and associated electronics to detect and track targets based on target returns.

When the target returns have much larger amplitudes than the clutter returns the target returns are clearly distinguishable from clutter returns on a radar display screen. Often clutter returns and target returns are comparable in magnitude and are thus visually indistinguishable. The target is in clutter. In such cases further signal processing is necessary to distinguish target returns from clutter returns.

Several state of the art techniques are employed to separate target returns from clutter returns. Previous approaches to detecting radar targets in clutter include using constant false alarm rate (CFAR) detector systems. In CFAR systems, only the magnitudes of the return signals are used to distinguish targets from clutter. Any signal which is significantly above the average clutter level will be declared a target. Another approach involves using range gate or Doppler filtering. This approach involves separating targets from clutter based on different ranges or Dopplers of the target returns and the clutter returns. The above approaches work reasonably well provided there is sufficient range/Doppler separation between the target returns and the clutter returns.

With CFAR systems and range gate or Doppler filtering, detection and tracking difficulty occurs when a target is moving perpendicular to the boresight of the radar system. A target moving in such a way is moving at beam aspect. A target that is at approximately the same range and Doppler of some portion of the clutter is near beam aspect. This is because typically Doppler values associated with clutter are equivalent to Doppler values associated with a target moving in a plane perpendicular to the boresight of the radar system. Targets are typically allowed to "coast" until they are no longer near or at beam aspect. If the coast time is large, radar systems employing CFAR or Doppler filtering will break lock and lose track of the target.

In U.S. patent application Ser. No. 08/485,743 filed Jun. 7, 1995, by M. B. Schober entitled RADAR SYSTEM AND METHOD FOR DETECTING TARGETS IN CLUTTER USING TARGET INTENSITY AND ANGULAR POSITION, (Atty. Docket No. PD 95120), the teachings of which are incorporated herein by reference, both angle information and magnitude information are used to detect radar targets at or near beam aspect. When using systems incorporating the teachings of the above-referenced patent application, the measured angles to targets in clutter are corrupted by clutter angles. Such systems alone do not supply the necessary accurate angle information required for accurate target tracking.

Hence, a need exists in the art for a radar tracking system capable of accurately tracking radar targets in clutter or at beam aspect. Such a system should obtain accurate angle information.

SUMMARY OF THE INVENTION

The need in the art is addressed by radar tracking system of the present invention. In the illustrative embodiment, the inventive tracking system is adapted for use with existing radar tracking systems and includes a radar target detection system for detecting radar targets in clutter using magnitude and angular position information obtained from return signals. A tracking algorithm is used to track and update the positions of the targets with respect to the position of the radar system. The tracking algorithm includes a true target angle estimator for maintaining accurate target angle information when the target is clutter and when the target is out of clutter.

In a specific embodiment, accurate position information is maintained in a track file where the range, Doppler and angles of return signals are filtered once a target is detected by the detection system.

In the illustrative embodiment the tracking system is operated in accordance with a tracking method which includes forming a range Doppler matrix (RD matrix). The RD matrix is used to determine if the radar target is in the beam region of the radar system, is in clutter, or is in a noise only region of the RD matrix. If the target is in a noise only region of the RD matrix a conventional detection and tracking algorithm is used to detect and track the target. If the target is in the beam region of the radar system or is in clutter, the inventive tracking algorithm is used and includes selecting locations in the RD matrix for testing. The inventive tracking algorithm further includes sampling clutter returns and potential target returns for obtaining clutter angle and magnitude information and target magnitude and angle information. The algorithm further includes applying a beam detection algorithm which utilizes the clutter angle and magnitude information and the target magnitude and angle information to detect the target. Then, the true angle estimator decentroids target angle information. Next, existing filters or track files are updated with the more accurate target angle information, the target magnitude information, and the clutter magnitude and angle information. The above tracking method is repeated as necessary to track a target through regions of the RD matrix.

BRIEF DESCRIPTION OF THE DRAWINGS

FIG. 3 is an example RD matrix plan view showing clutter regions, noise only regions, and an example range Doppler location.

FIG. 4 is RD matrix amplitude depiction of the example RD matrix of FIG. 3.

FIG. 5 is an example RD matrix amplitude depiction detailing the possible movement of a target through clutter and noise only regions.

FIG. 6 is a diagram of an RD matrix illustrating a possible sample pattern around a range Doppler location, taken in accordance with the teachings of the present invention.

FIG. 7 is a diagram depicting a system for providing decentroided angle information and angle variance information in accordance with the teachings of the present invention.

DESCRIPTION OF THE INVENTION

Figure 1:
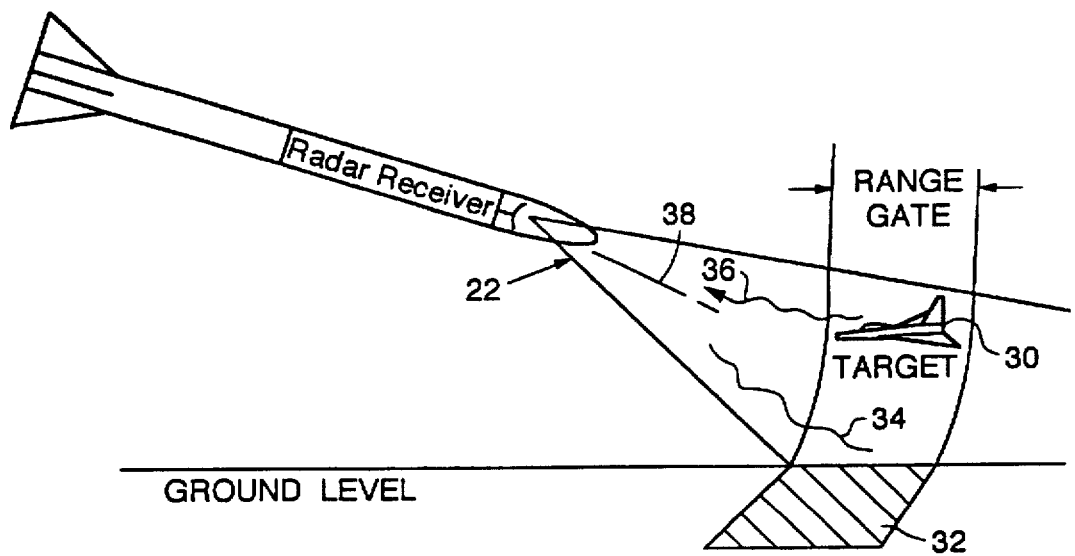
FIG. 1 is a side view of a radar system tracking a target whose signal returns are close to the same range and Doppler as signal returns from an illuminated clutter patch on the ground.

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Radar system electronics compute the time elapsed before the receiver detects reflected signals. The elapsed time is used to compute a distance to the objects that reflected the signals. By receiving reflected signals from objects around a target, the radar system establishes a distance range (range gate) in which the target may be located. In addition, the associated electronics compute the magnitude of the return signal, and the angle at which the signal returns to the radar receiver with respect to the boresight of the radar system. Angle information, magnitude information, and range information determined from the return signal are typically stored in a range Doppler matrix (RD matrix).

In the preferred embodiment the radar system is implemented in accordance with the teachings of abovereferenced U.S. Patent Application by M. B. Schober (hereinafter the "Schober Application"). As disclosed in the Schober application, a specialized detection algorithm combines both amplitude and angle information from an RD matrix to detect a target. The use of additional angle information permits target detection at lower signal-to-clutter ratios than more traditional CFAR detection methods.

FIG. 1 is a side view of a radar system 20 tracking a target whose signal returns 34 are close to the same range and Doppler as signal returns 36 from an illuminated clutter patch 32 on the ground. A radar system 20 transmits a signal beam called the antenna mainbeam 22 that is centered around a line of sight vector 38. The line of sight vector 38 corresponds to the boresight of the radar system 20. The signals in the mainbeam 22 are reflected off objects within a specified distance or range gate of the radar system 20. By receiving all return signals reflected back to the radar system 20 in a pre-selected time interval, the range gate in which the radar system 20 receives and processes signals is established. The target 30 is close enough to the illuminated clutter patch 32 on the ground that signals reflected from the clutter patch 34 and signals reflected from the target 36 interfere. Magnitude and angle information detected in the clutter return signal 34 camouflage magnitude and angle information from the target return signal 36. The target 30 is said to be in clutter.

Figure 2:
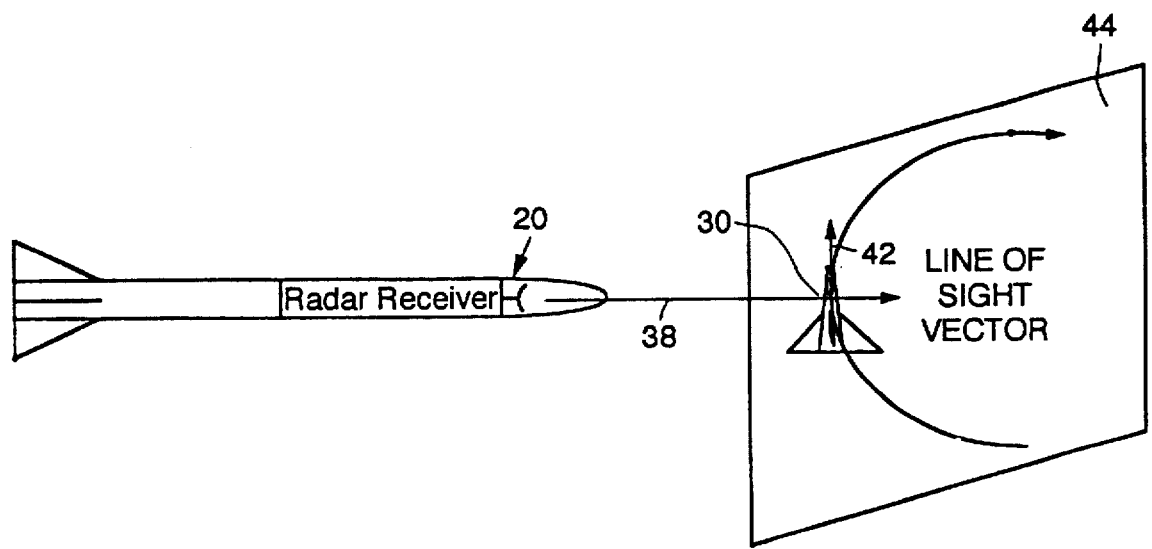
FIG. 2 is a top view of the radar system of FIG. 1 illustrating the target at beam aspect.

FIG. 2 is a top view of the radar system of FIG. 1 illustrating the target at beam aspect. A target velocity vector 42 is shown depicting the magnitude and direction of the target's velocity. When the velocity vector of the target 42 is perpendicular to the line of sight vector 38 of the radar system 20, the target is said to be at beam aspect. For the target 30 to be at beam aspect, the target 30 may have any velocity vector as long as the velocity vector lies in a plane 44 perpendicular to the line of sight vector 38. The radar tracking system 20 of the present invention can track targets moving at beam aspect whereas previous tracking systems could not accurately track such targets.

FIG. 3 is an example RD matrix plan view showing clutter regions, noise only regions, and an example range Doppler location. The present invention utilizes magnitude and angle information from the RD matrix, detects a target, and follows the target based on values computed by the present invention as the target moves through different regions of the RD matrix. Between a first clutter region 46 and a second clutter region 48 is a noise only region 52. Within the noise only region is an exemplary range Doppler target location 54. The clutter regions 46, 48 are caused by the antenna mainlobe illuminating objects on the ground. The noise only region 52 is caused by receiver noise typical of any electrical system. In the noise only region 52, traditional radar tracking methods such as those methods utilizing CFAR analysis are suitable for tracking targets, such as might be located at the exemplary range Doppler target location 54. The horizontal dimension of FIG. 1 establishes the distance range or range gate in which samples are taken for the RD matrix.

FIG. 4 is RD matrix amplitude depiction of the example RD matrix of FIG. 3. The horizontal axis 45 represents Doppler locations and the vertical axis 47 represents magnitudes. The clutter regions 46, 48 are shown with corresponding clutter return magnitudes. The magnitudes of clutter returns may taper off as one moves toward an edge of the clutter. For example near an edge 56 of the clutter region 46, the magnitude of the clutter return approaches zero.

By forming a bank of Doppler filters for each range gate, targets with sufficient Doppler can be separated from clutter. The possible target location 54 of FIG. 3 is shown as having a corresponding target return 58 in FIG. 4. Since the target return 58 is in a noise only region where the magnitudes of clutter returns are approximately zero, the target may be readily detected and tracked using conventional radar target tracking technology.

FIG. 5 is an example RD matrix amplitude depiction detailing the possible movement of a target through clutter and noise only regions. Initially, the target return 58 is at a first Doppler location 62 in the noise only region 52 where it is readily detectable using conventional radar tracking systems. The target return 58 then moves toward the first clutter region 46 to a second Doppler location 64 where it is still readily tracked using prior art approaches. Subsequently, the target return 58 moves to a third Doppler location 66. At the Doppler location 66, the target return 58 is mixed with the clutter returns from the clutter region 46. A typical angle estimate (not shown) taken at the location 66 represents the angle to the power centroid (not shown) of the combined target and clutter returns. To accurately track a target at the location 66, target angle information must be decentroided or separated from the clutter angle information. Traditional radar tracking methods fail to track or detect targets in this situation. Targets are allowed to coast until they exit clutter regions such as clutter regions 46 and 48.

The radar target detection algorithm presented in the Schober application presents a method for detecting radar targets in clutter such as at the Doppler location 66. However, the detection algorithm does not provide a way to accurately track a target in clutter. This is because corrupted target angle information is received at Doppler locations such as location 66. If a radar tracking system follows a target and has corrupted angle information, the radar system will lose track of the target location, and will eventually be unable to detect the target as erroneous angle information pulls the radar antenna off the target.

At a fourth Doppler location 68, the target represented by the target return 58 has maneuvered through the clutter region 46 to the edge of the clutter region 48. In FIG. 5, the clutter regions 46 and 48 represent two different halves of a continuous clutter region (continuity not shown). The movement of the target return 58 through the clutter regions and the clutter regions 46, 48 shown are for example purposes only. Those skilled in the are will appreciate that the radar tracking system of the present invention is applicable to a wide range of target maneuvers.

According to the teachings of the present invention, a track file (not shown) is initialized at the first Doppler location 62 when the target is in the noise only region 52. When the target is about to enter the first clutter region 46 at the second Doppler location 64, the present invention applies an acceleration bias to range Doppler tracking states in the track file (not shown) if the track file does not maintain acceleration values. At the third Doppler location 66, the specialized detection algorithm disclosed in the Schober application is applied to detect the target. The algorithm may be applied to the entire clutter region or to a small area around the estimated target location 66 in range and Doppler. When a detection is made, magnitude and angle measurements corresponding to the target range Doppler location are applied to a specialized tracking algorithm of the present invention. The specialized tracking algorithm takes information required by the detection algorithm of the Schober application and computes a decentroided angle estimate and a variance. The decentroided angle estimate is then used as if it were an angle measurement made in a noise only region such as region 52. The specialized tracking algorithm of the present invention is continued as long as the target return 58 is in a clutter region 46, 48. A traditional tracking method is used when the target return 58 is not associated with clutter such as clutter from the regions 46 and 48.

FIG. 6 is a diagram of an RD matrix illustrating a possible sample pattern 70 around a range Doppler location 76, taken in accordance with the teachings of the present invention. For illustrative purposes, the sample pattern 70 includes a first rectangular sample pattern 72 and a second rectangular sample pattern 74. The sample pattern 70 is centered around the range Doppler location 76 where a target is presumed to be detected. By sampling the clutter around the individual location 76, magnitude and angle information about the surrounding clutter is obtained. The magnitude and angle information is used by the algorithm of the present invention to distinguish target returns from clutter returns 46, 48. Those skilled in the art will appreciate that other sample patterns may be used for this purpose without departing from the scope of the present invention.

The individual location 76 is also sampled so that corresponding angle and magnitude information may be input into the algorithm of the present invention. The sample pattern 70 simply defines where in the RD matrix to take samples. The samples are used to compute the average interference amplitude and average interference angle corresponding to the clutter, and are used in the detector formula of the Schober application.

According to the teachings of the present invention, sample patterns are always applied around the range Doppler location under test, which in FIG. 6 is the location 76. This ensures that the magnitude and angle information retrieved from the sample pattern 70 will be representative of the magnitude and angle information of the surrounding interfering clutter 46, 48. An alternative sample pattern could include samples of only local signal magnitude peaks in the clutter region 46, 48, or could include every location in the clutter region 46, 48, or just a subset of the clutter region 46, 48. The subset could be defined by estimated target data from a corresponding track file (not shown).

FIG. 7 is a diagram depicting a system 90 for providing decentroided angle information and angle variance information in accordance with the teachings of the present invention. Those skilled in the art will appreciate that the system 90 may be implemented in hardware or software. Magnitude and angle information are obtained from the range Doppler matrix (not shown) and are used in the detection algorithm of the above Schober application. However, as mentioned above, target detection is not enough to track a target. Accurate angle information as well as range and Doppler measurements about the target returns are required. The range and Doppler measurements are obtained from an individual detection location (not shown) in an RD Matrix (not shown).

In FIG. 7 Ro represents an average magnitude of clutter returns and R represents the magnitude of the RD Matrix value under test. Ro and R are part of a set of inputs 81. In a first power circuit 78, the power Po of the clutter return is calculated by squaring the clutter magnitude average Ro. In a second power circuit 82, the power P1 of the target return is calculated by squaring the target magnitude average R. Po and P1 are input to a threshold comparator 84. In the threshold comparator 84 the ratio of the target power P1 to the clutter power Po is compared to a threshold which is radar system dependent. If the power ratio exceeds the predetermined threshold then it is assumed, as shown in a box 85 that the angle information obtained directly from the RD matrix is accurate and may be used in tracking the target. Angle information pertaining to the target location and variance estimated based on the power ratio P1/Po and using formulas commonly available for the noise only region are provided as output 92. If the power ratio is less than the predetermined threshold, the angle information supplied in the RD matrix is likely corrupted and is decentroided before use in tracking the target. Target angle information is likely to be mixed with clutter angle information.

In a decentroiding circuit 86 the power of the clutter samples Po, the power of the target returns P1 and clutter and target angle information are used to decentroid the target return. In the decentroiding circuit 86, angle information is separated from the clutter angle information using a true target angle estimator (circuit 86). θo, and θ represent angle averages of clutter returns and target return samples respectively and are part of the set of inputs 81 to the system 90.

A decentroided angle $\theta_{new}$ is output from the true target angle estimator (circuit 86) calculation. Those skilled in the art will appreciate that other decentroiding calculations may be used without departing from the scope of the present invention. The decentroiding circuit 86 performs the following true target angle estimator calculation:

$$\theta_{new} = ((Po+P1)\theta - Po\theta o)/P1 \quad [1]$$

In addition to decentroiding the angular target position information θ, a variance circuit 88 computes the variance of the decentroided angle $\theta_{new}$ about the true target location. For two signal sources at different angles, the variance of the combined signal will be a function of the angle separation of the two sources. A large difference between the true target angle with respect to the average clutter angle θo results in a large variance. The variance of the decentroided angle $\theta_{new}$ is found in the following calculation implemented by the variance circuit 88 where θ1 is the angle location of the target and N is the magnitude of the non-coherent integration used in forming the RD matrix. N is input to the system 90 as data 94.

$$\sigma_\theta^2 = (Po/P1)(\theta1 - \theta o)^2/(2(N-1)) \qquad [2]$$

The expected value of $\theta_{new}$, i.e. E[$\theta_{new}$] is the true target location θ1 provided a large enough sample pattern is taken with many samples. As a result the decentroided angle $\theta_{new}$ is a "nominally unbiased" estimator of the true target location. Since the true target location θ1 is not known, the variance circuit 88 must use a substituted value for θ1. Either the just decentroided angle $\theta_{new}$ or previously smoothed data from the angle track files may be used. The variance $\sigma_\theta^2$ is used by the tracking method of the present invention as a weighting factor for weighting the decentroided angle $\theta_{new}$ with previously calculated angle values. If a decentroided angle $\theta_{new}$ results in a large variance $\sigma_\theta^2$, then previous angle estimates in the track file (not shown) that have smaller variances will be used more extensively in tracking the target (not shown). This is standard practice. Those skilled in the art will appreciate that a computer may be used to implement the system 90 and its associated calculations.

Figure 8:
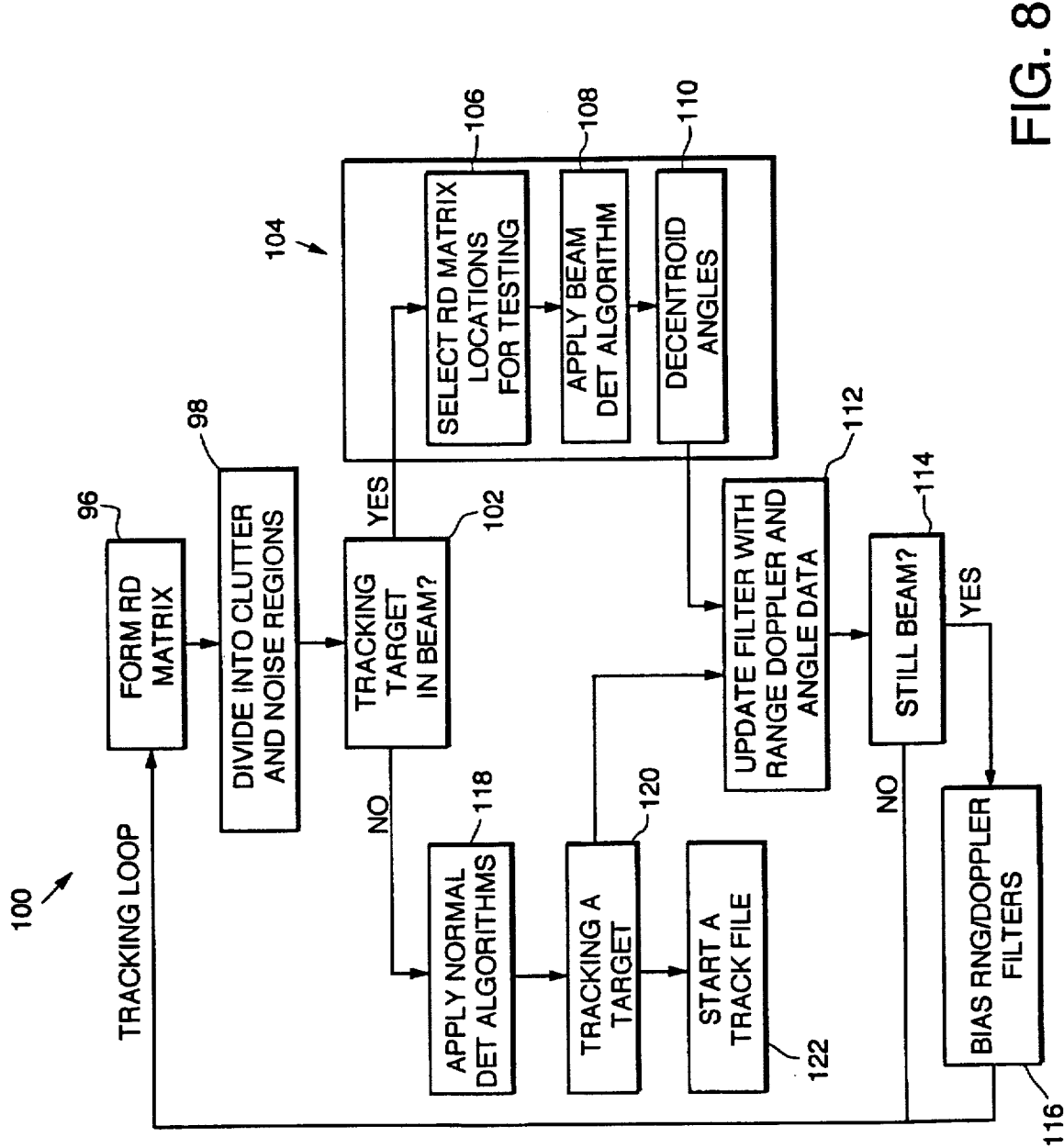
FIG. 8 is a block diagram of an illustrative embodiment of a method of the present invention for tracking radar targets in clutter and out of clutter.

FIG. 8 is a block diagram of an illustrative embodiment of a method 100 of the present invention for tracking radar targets in clutter and out of clutter. In an RD matrix step 96 an RD matrix (not shown) is formed using existing radar system hardware. The RD matrix is then divided into clutter and noise regions in a separation step 98. After checking the RD matrix for targets, a determination is made as to whether or not a potential target (not shown) is in the beam region of the radar system (not shown) or is immersed in clutter or is in a noise region in a beam step 102.

If a potential target is at the same range and Doppler of some portion of the clutter, or is in the beam region of the radar system (not shown) as determined in the beam step 102, then a tracking algorithm 104 is executed in accordance with the teachings of the present invention.

The tracking algorithm 104 includes first selecting locations in the RD matrix (not shown) for testing in a selection and sampling step 106. The locations include sample patterns in the RD matrix for taking clutter return samples, and include the expected location of the target. Averaging calculations (not shown) are performed on the various magnitude and angle samples taken in the selection and sampling step 106. The averages are used in a beam detection algorithm 108. In the preferred embodiment the beam detection algorithm utilizes both angle information and magnitude information in accordance with the teachings of the Schober application. If the target is not detected by using the algorithm 108 then the tracking system of the present invention coasts. The present invention minimizes coast time.

The averages obtained in the selection and sampling step 106 are then used in a decentroiding step 110. Details of the decentroiding step 110 are depicted in the system diagram of FIG. 7. The decentroiding step 110 supplies variance information and decentroided target angle information for use in the tracking method of the present invention. The decentroided target and angle information is then used to update existing filters and track files in an updating step 112.

In a checking step 114 the RD matrix is analyzed to determine if the potential target is still in the beam region of the radar system (not shown) or is still in clutter. If the target is still in clutter or is in the beam region then existing range Doppler filters are biased in a biasing step 116. Biasing the filters involves updating position, velocity and acceleration vectors with the best estimates as to the latest status of the target. If the target is no longer in clutter or in the beam region then a new RD matrix (not shown) is formed with the updated data from the updating step 112 in the RD matrix step 96.

If in the beam step 102 the potential target (not shown) is not determined to be in the beam region or in clutter then a normal radar detection algorithm such as CFAR is applied in a detection step 118. If the radar system (not shown) is tracking a target as determined in a decision step 120 then the updating step 112 is executed and filters are updated with any new range, Doppler, or angle data. Otherwise, a track file is started in a track file step 122. Current information about the range, Doppler, angle, acceleration, and velocity of the potential target is included in the track file (not shown).

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly, what is claimed is:

1. A radar system comprising:
   means for detecting radar targets in clutter using magnitude and angular position information obtained from return signals and
   means for tracking and updating the positions of said targets with respect to the position of the radar system, said means for tracking including angle means for extracting target angle information from clutter angle information when the target is in clutter.

2. The invention of claim 1 wherein said means for tracking includes a track file for filtering information about a target once a target is detected by said means for detecting.

3. The invention of claim 1 wherein said means for tracking includes means for accessing current range and Doppler information within a radar mainlobe beamwidth of the radar system.

4. The invention of claim 3 wherein said angle means includes means for decentroiding said angle values, said means for decentroiding having a system for factoring out angle information received from clutter returns from angle information received from target returns.

5. The invention of claim 4 wherein said angle means includes the following equation for factoring out angle information received from clutter returns from angle information received from target returns:

$$\theta_{new} = ((Po+P1)*\theta - Po*\theta o)/P1$$

where Po is the average power of the clutter, P1 is the power of a test signal such as a potential target return, θ is the angular position of said test signal, θo is the average angle of said clutter returns, and $\theta_{new}$ is decentroided angle information whose expected value is the actual angle of the target.

6. The invention of claim 4 wherein said means for decentroiding said angle values includes an accuracy means for determining the accuracy of decentroided angle information.

7. The invention of claim 6 wherein said accuracy means includes a system which computes variance as a function of angular separation distance between an estimated true target location and an estimated location of the clutter.

8. The invention of claim 7 wherein said estimated true target location is said decentroided angle information.

9. The invention of claim 7 wherein said estimated true target location is an averaged or smoothed angle value obtained from a track file.

10. The invention of claim 7 wherein said variance is computed using the following equation:

$$\sigma_\theta^2 = (Po/P1)(\theta_{new} - \theta o)^2/(2(N-1))$$

where $\sigma_{74}^2$ is the variance, Po is the average power of said clutter returns, P1 is the power of a test signal such as a potential target return, $\theta_{new}$ is the estimated true target location and $\theta o$ is the average angle of said clutter returns.

11. Method for tracking a radar target in clutter using a radar system comprising the steps of:

forming a range Doppler matrix (RD matrix);

determining from said RD matrix if said radar target is in the beam region of said radar system, is in clutter, or is in a noise only region of the RD matrix;

performing conventional detection and tracking algorithms if said target is in a noise only region of the RD matrix;

executing a tracking algorithm if said target is in the beam region of the radar system or is in clutter, said tracking algorithm including the steps of:

selecting locations in the RD matrix for testing and sampling clutter returns and potential target returns and providing clutter angle and magnitude information and target magnitude and angle information in response thereto;

applying a beam detection algorithm which utilizes said clutter angle and magnitude information and said target angle and magnitude information to detect said target;

decentroiding said target angle information for providing an accurate true target angle estimate;

updating any required filters and track files of said radar system with said accurate true target angle estimate, said target magnitude information and said clutter magnitude and angle information; and repeating the above steps as necessary to track a target through regions of the RD matrix.

* * * * *